Nov. 3, 1959     C. F. HAUTAU     2,911,117
MANUFACTURE OF SPLICE BARS
Filed May 3, 1957     17 Sheets-Sheet 2
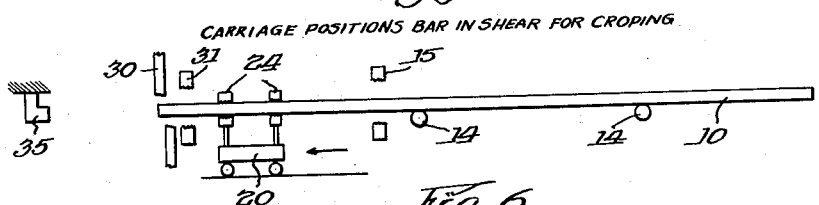
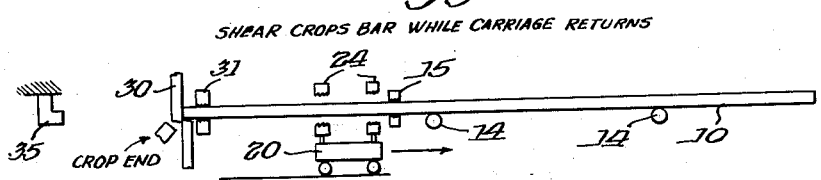
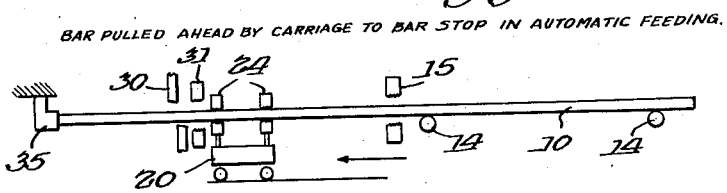
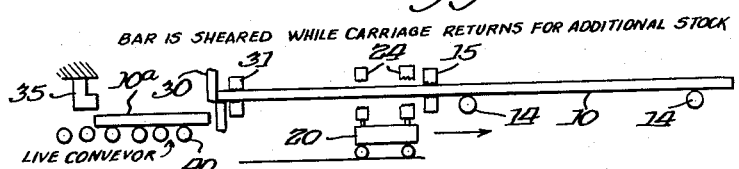
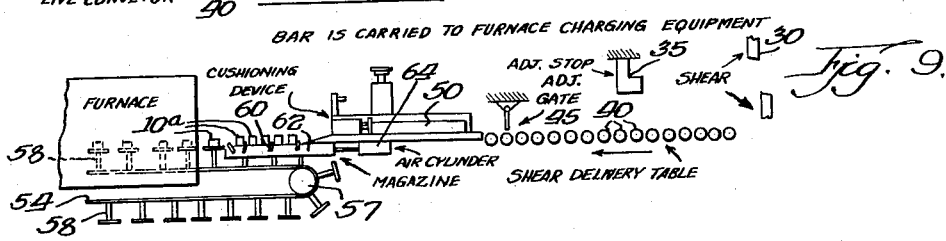
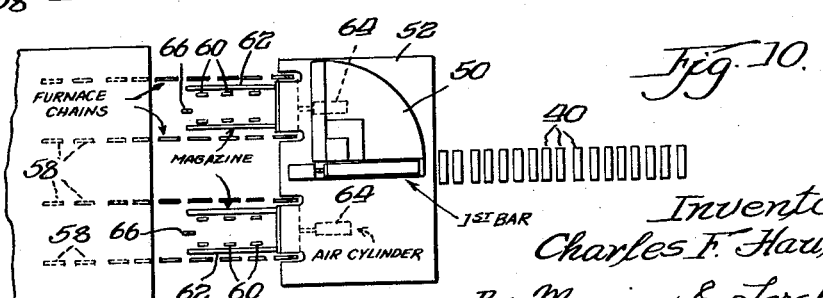
Inventor.
Charles F. Hautau.
By Merriam & Lorch.
Attys.

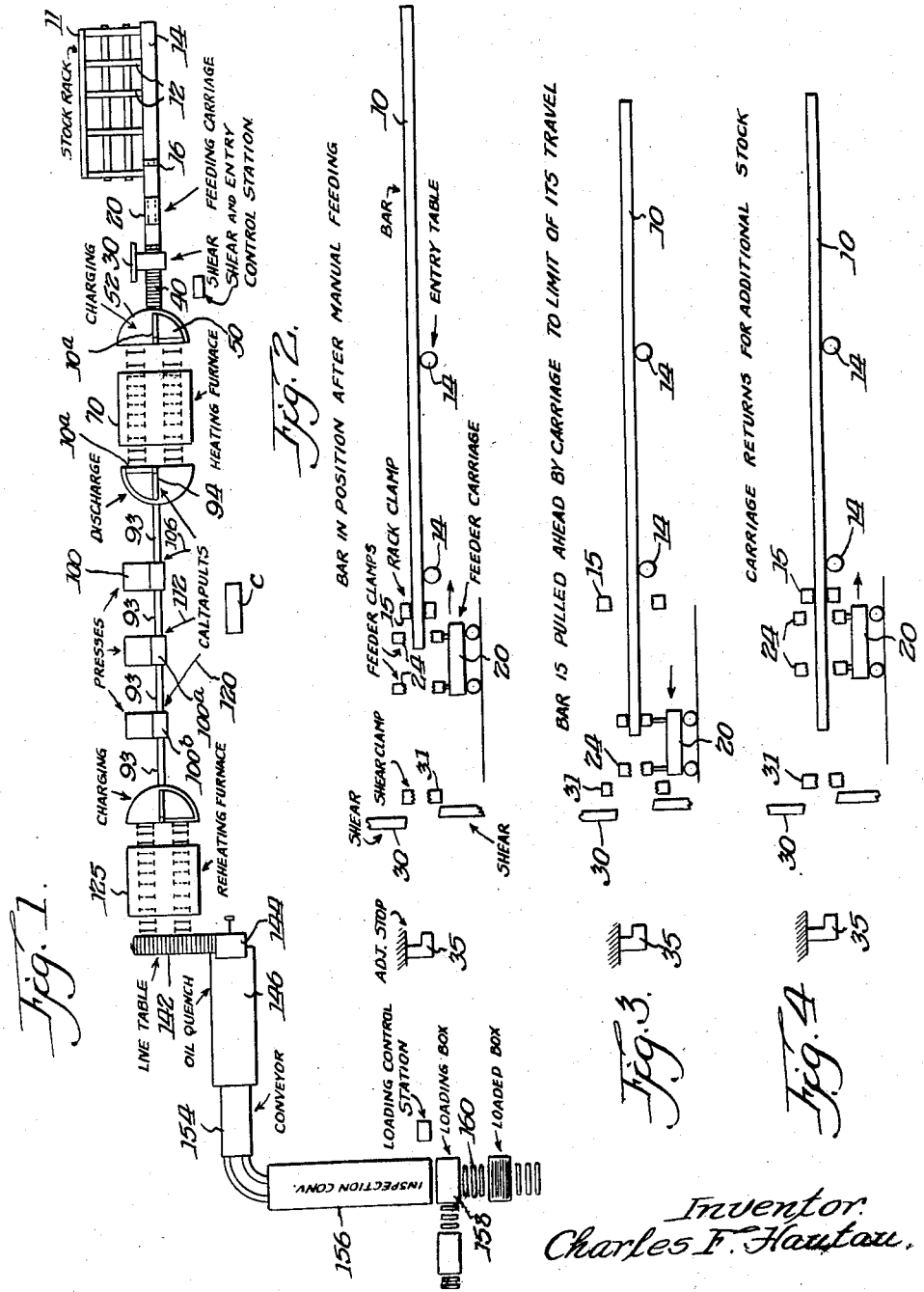

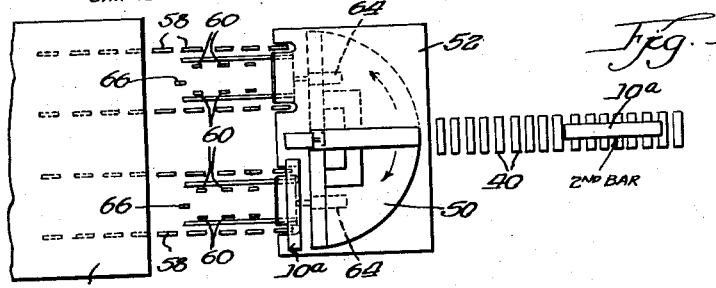
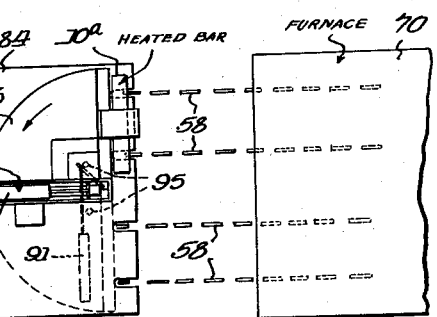
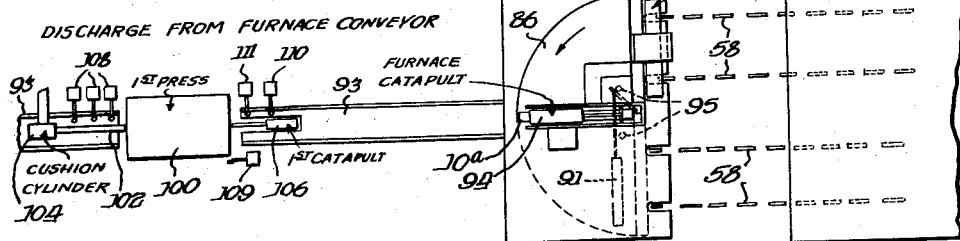
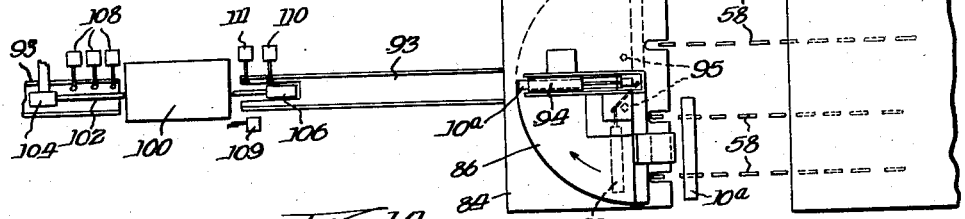
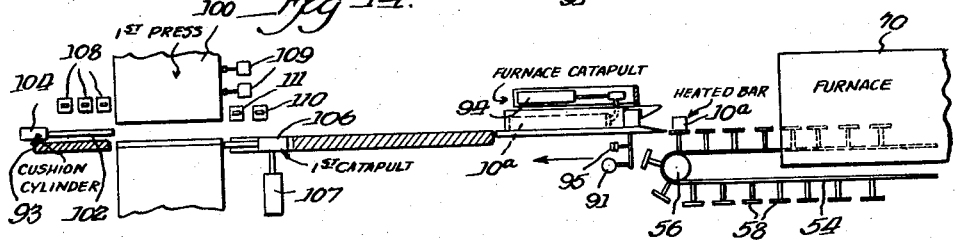

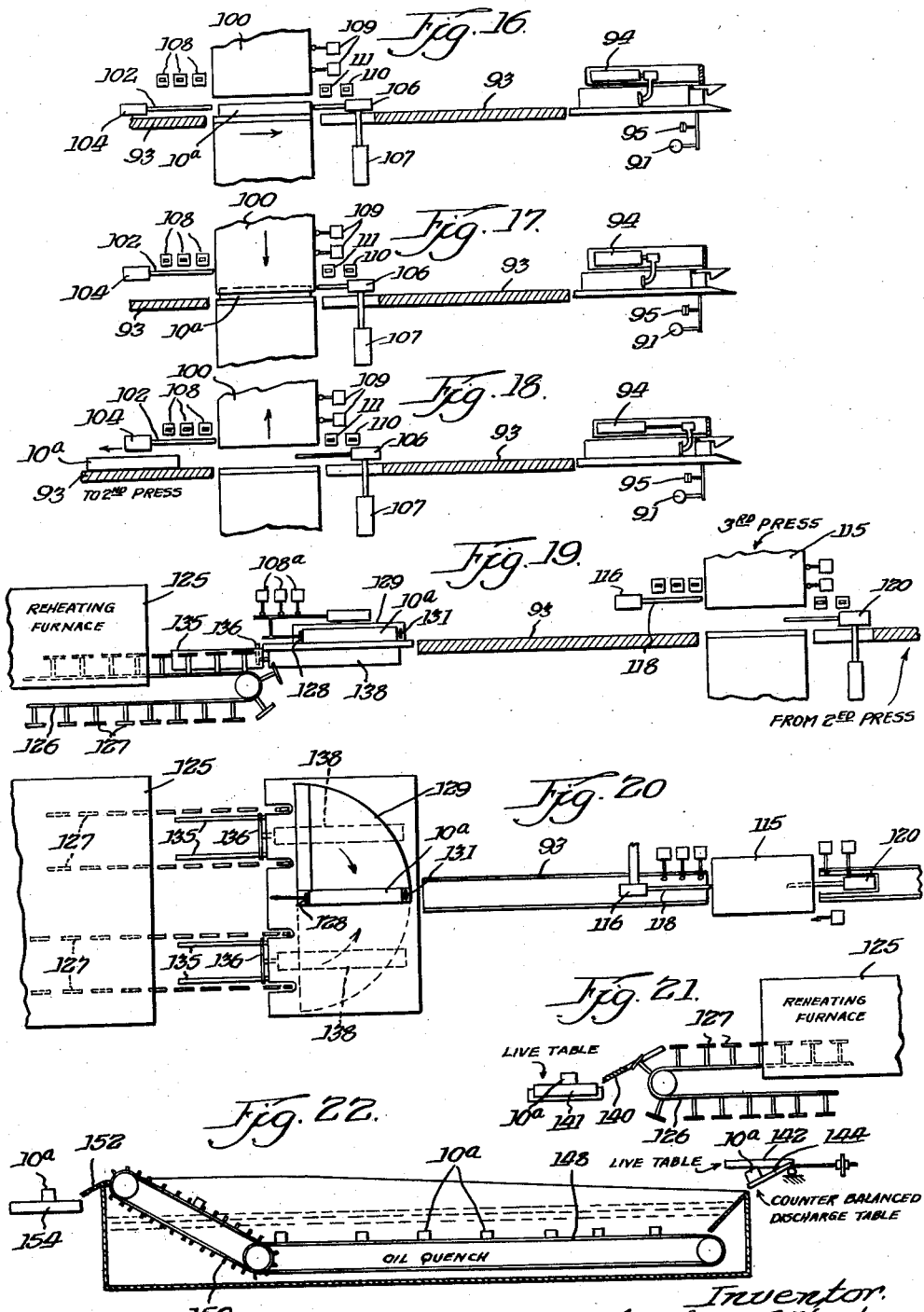

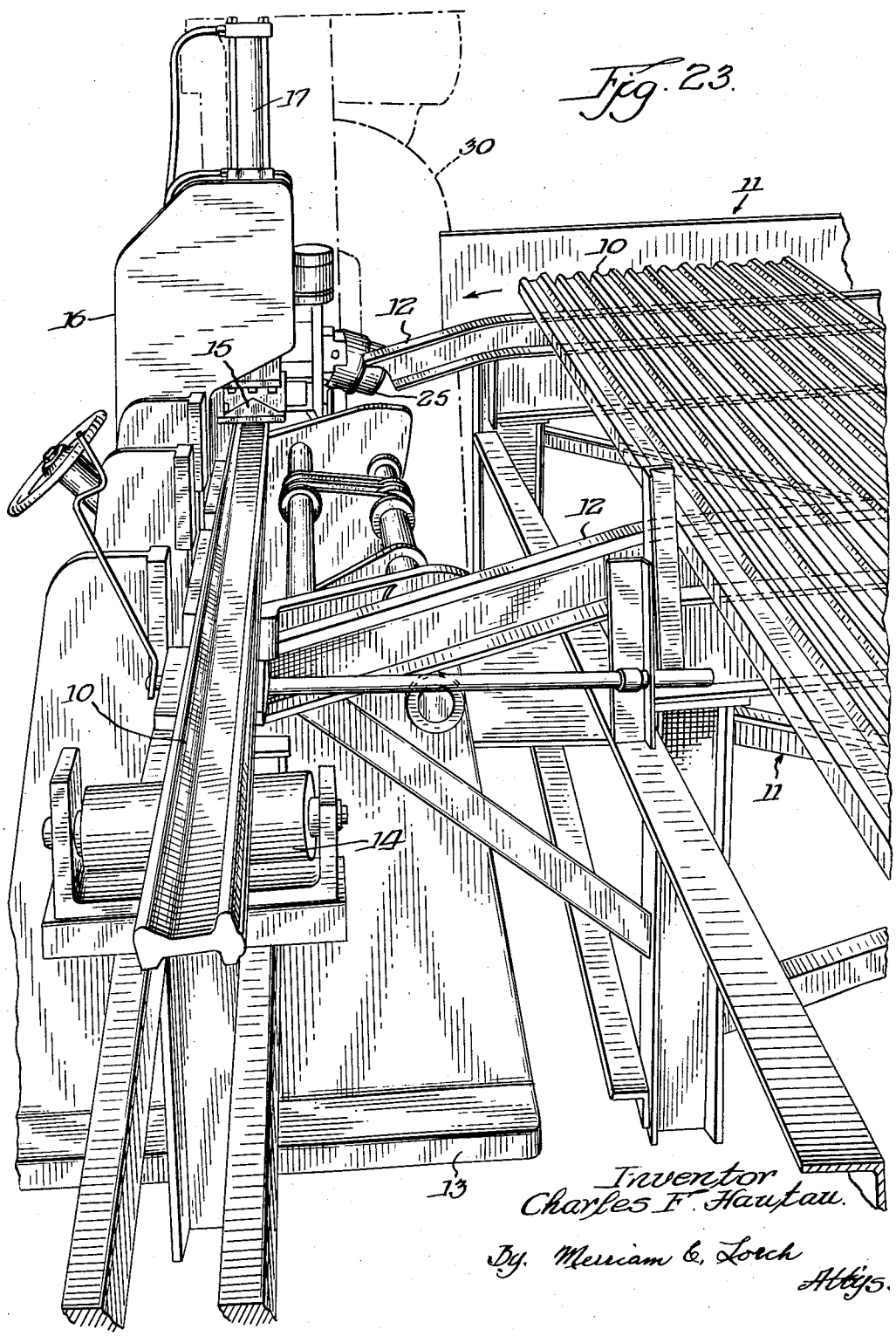

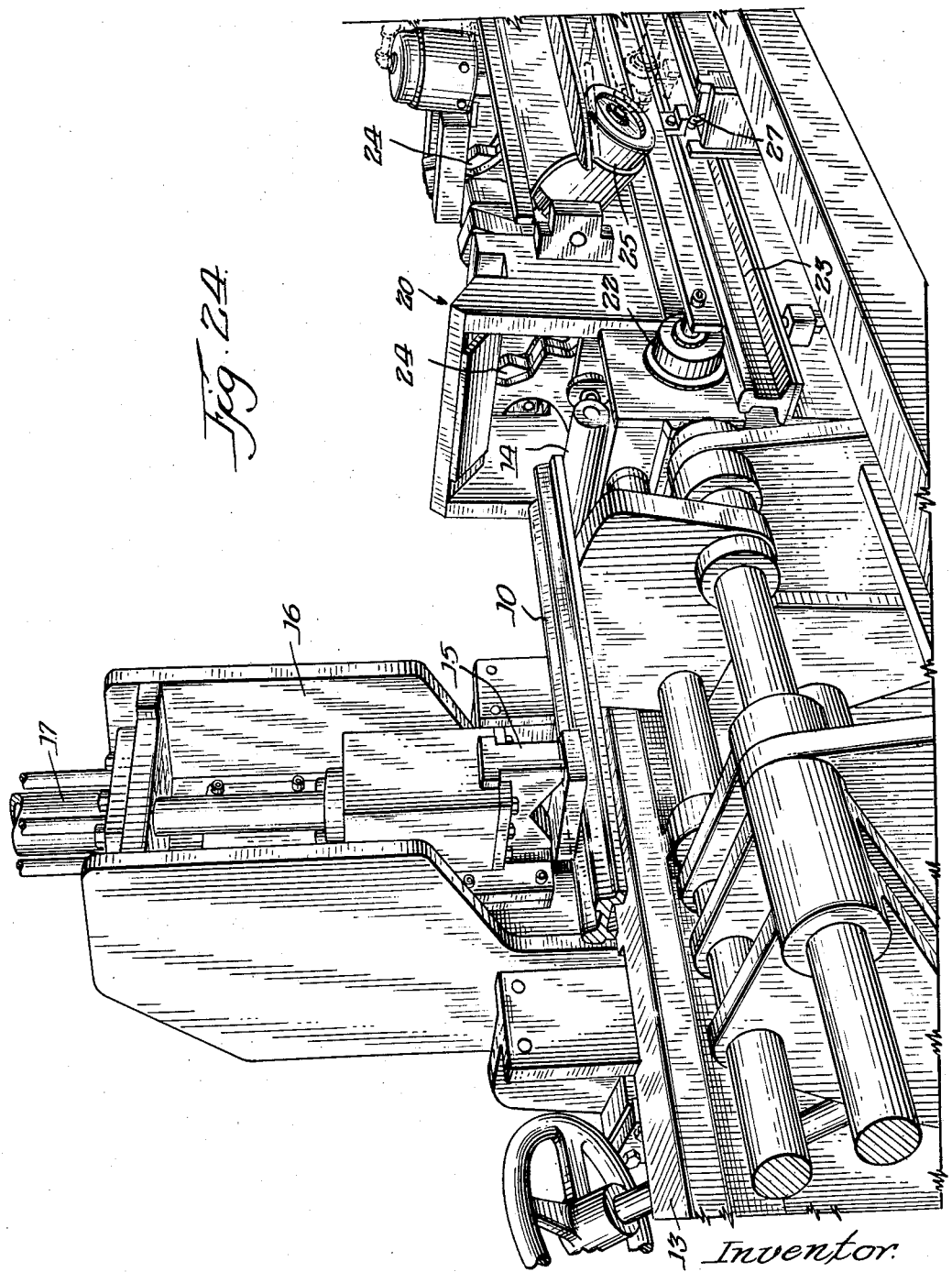

Nov. 3, 1959  C. F. HAUTAU  2,911,117
MANUFACTURE OF SPLICE BARS
Filed May 3, 1957  17 Sheets-Sheet 7
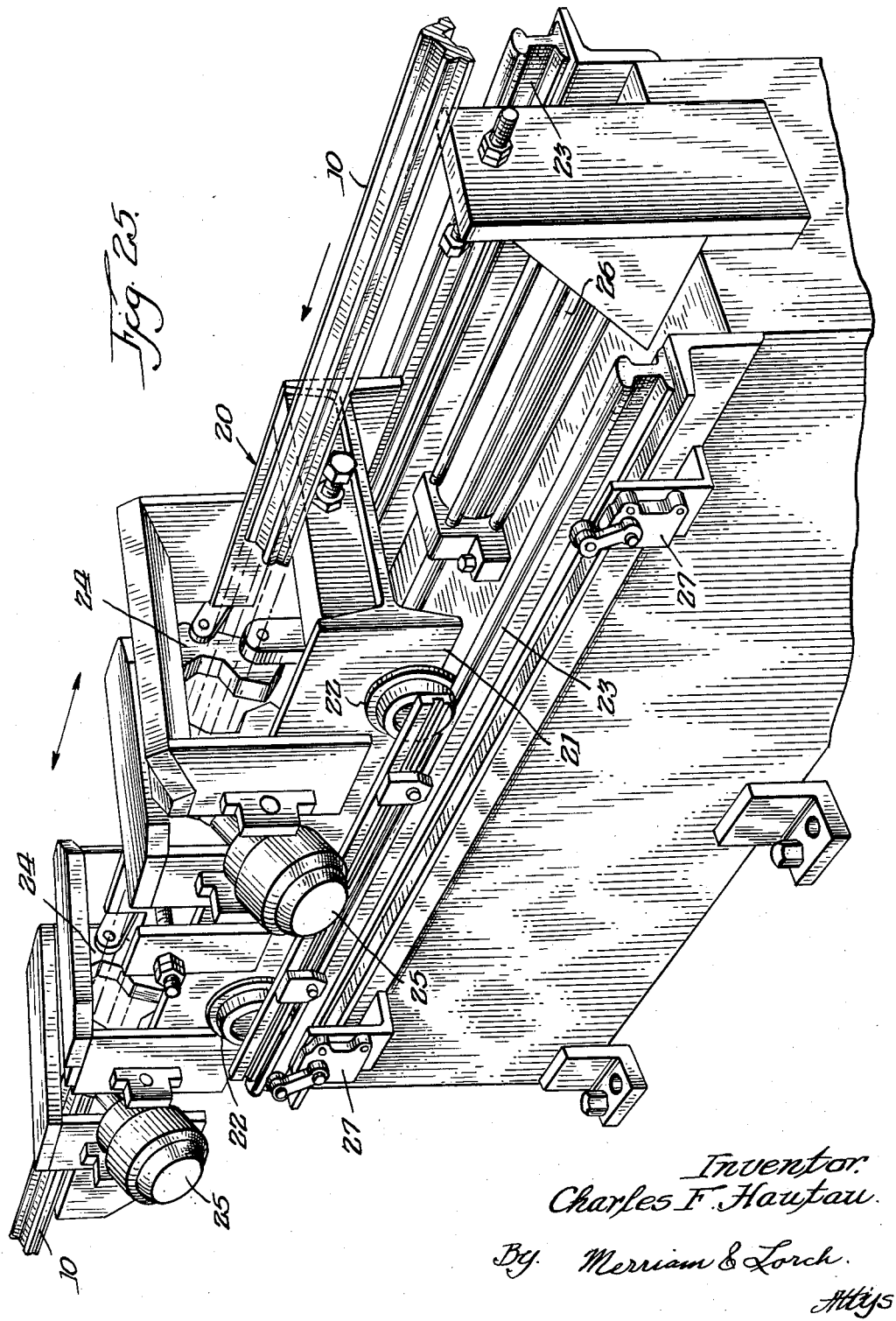
Inventor:
Charles F. Hautau
By Merriam & Lorch
Attys Nov. 3, 1959  C. F. HAUTAU  2,911,117
MANUFACTURE OF SPLICE BARS
Filed May 3, 1957  17 Sheets-Sheet 8

Inventor.
Charles F. Hautau.
By Merriam & Lorch.
Attys

Nov. 3, 1959     C. F. HAUTAU     2,911,117
MANUFACTURE OF SPLICE BARS
Filed May 3, 1957     17 Sheets-Sheet 9
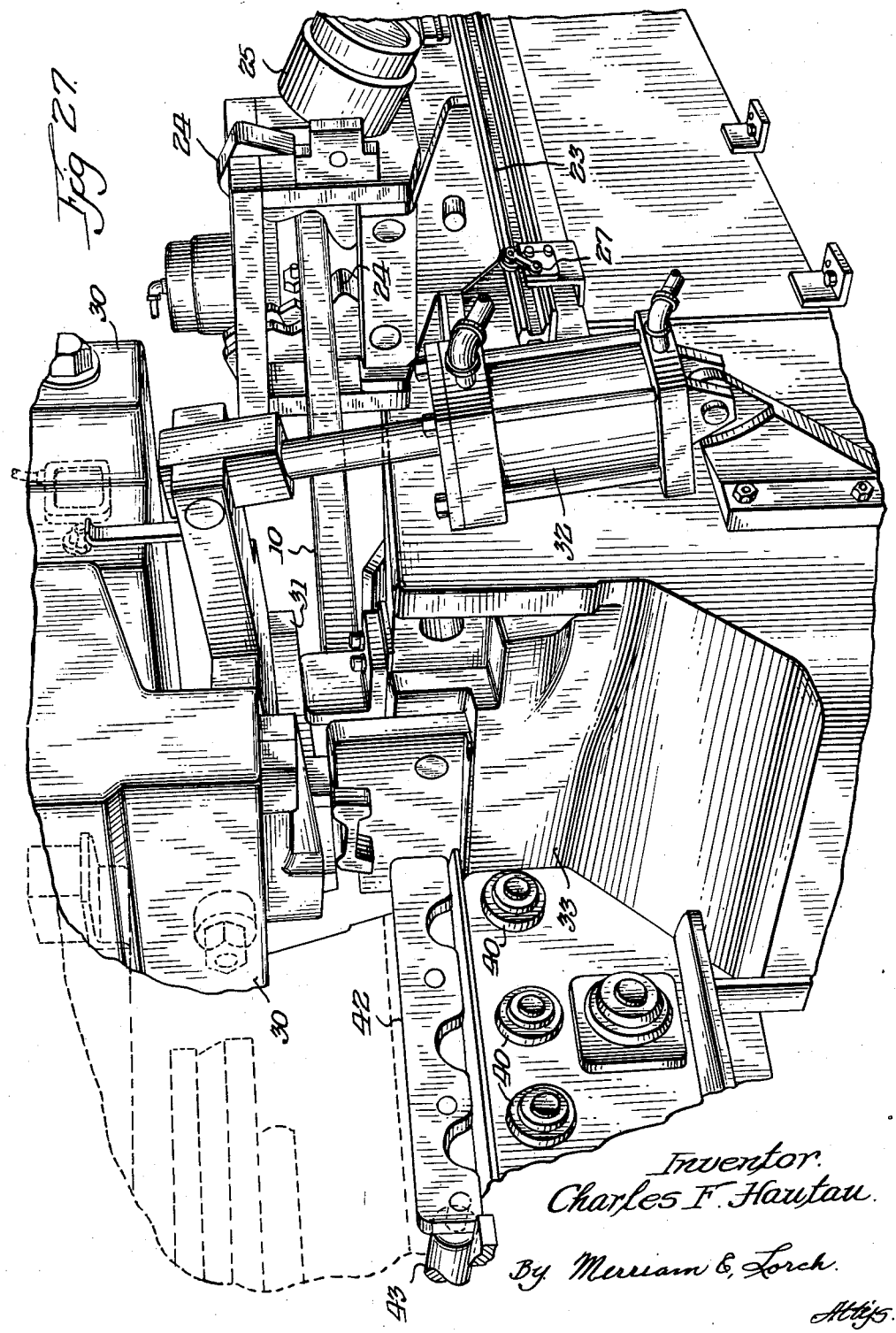

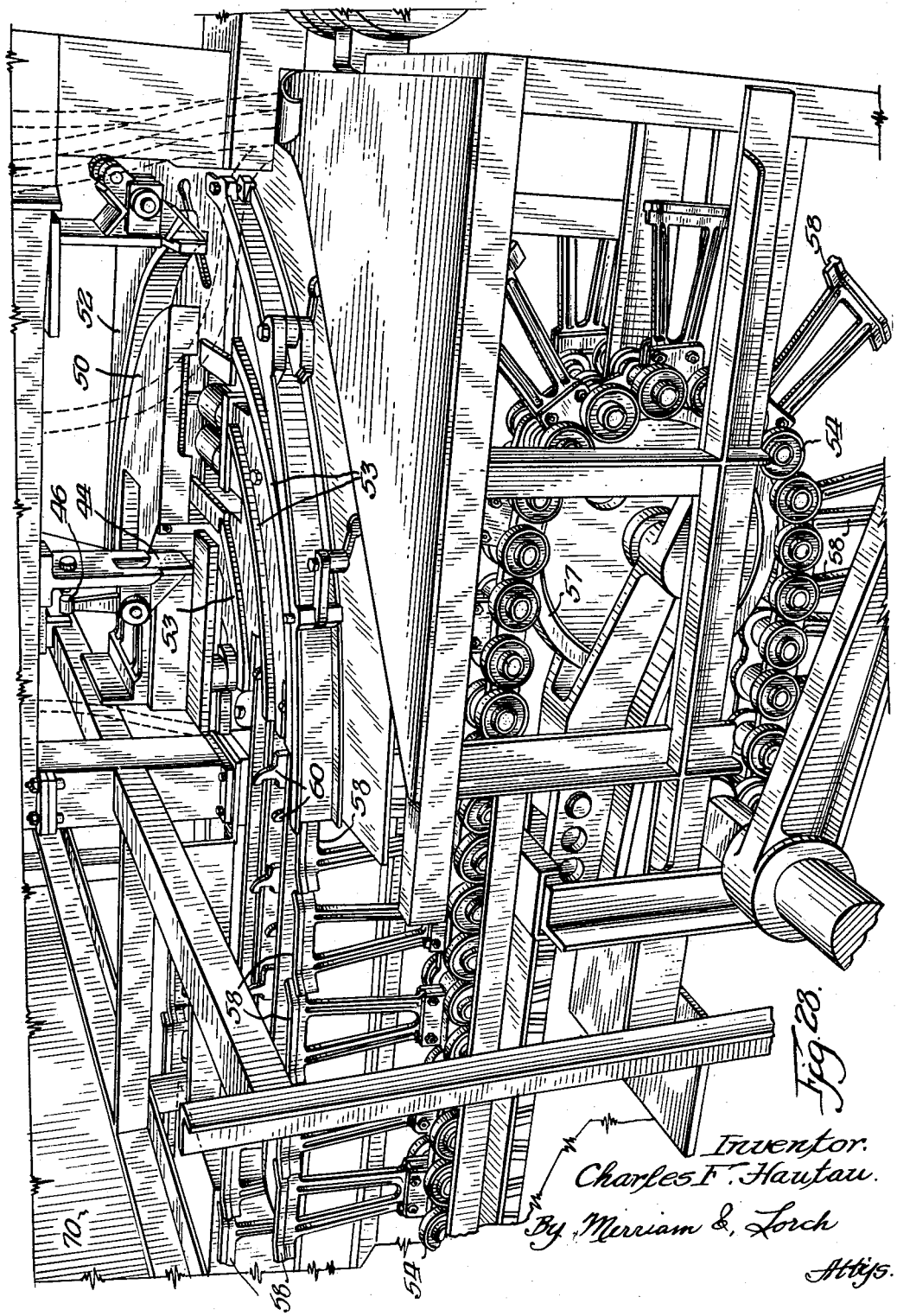

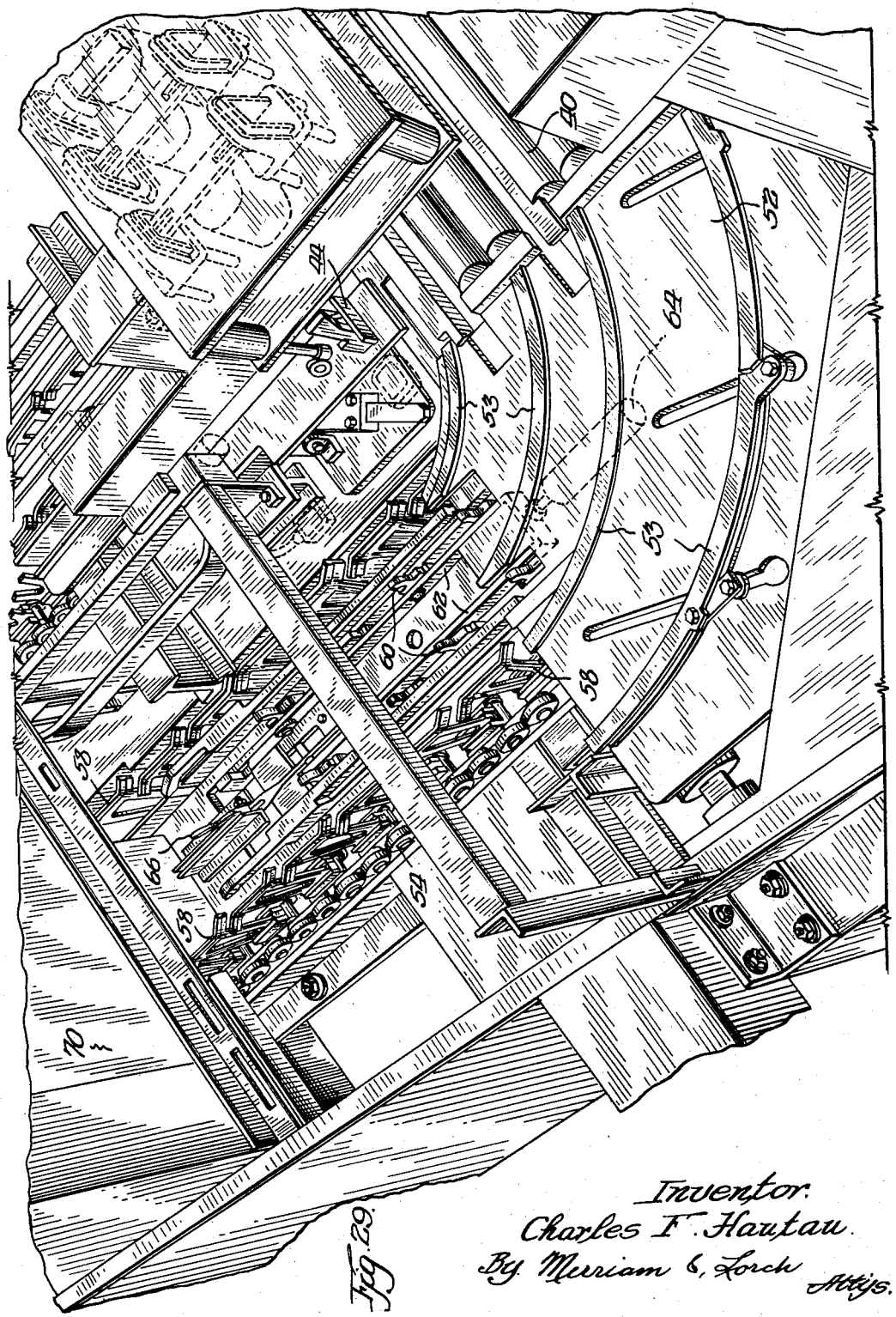

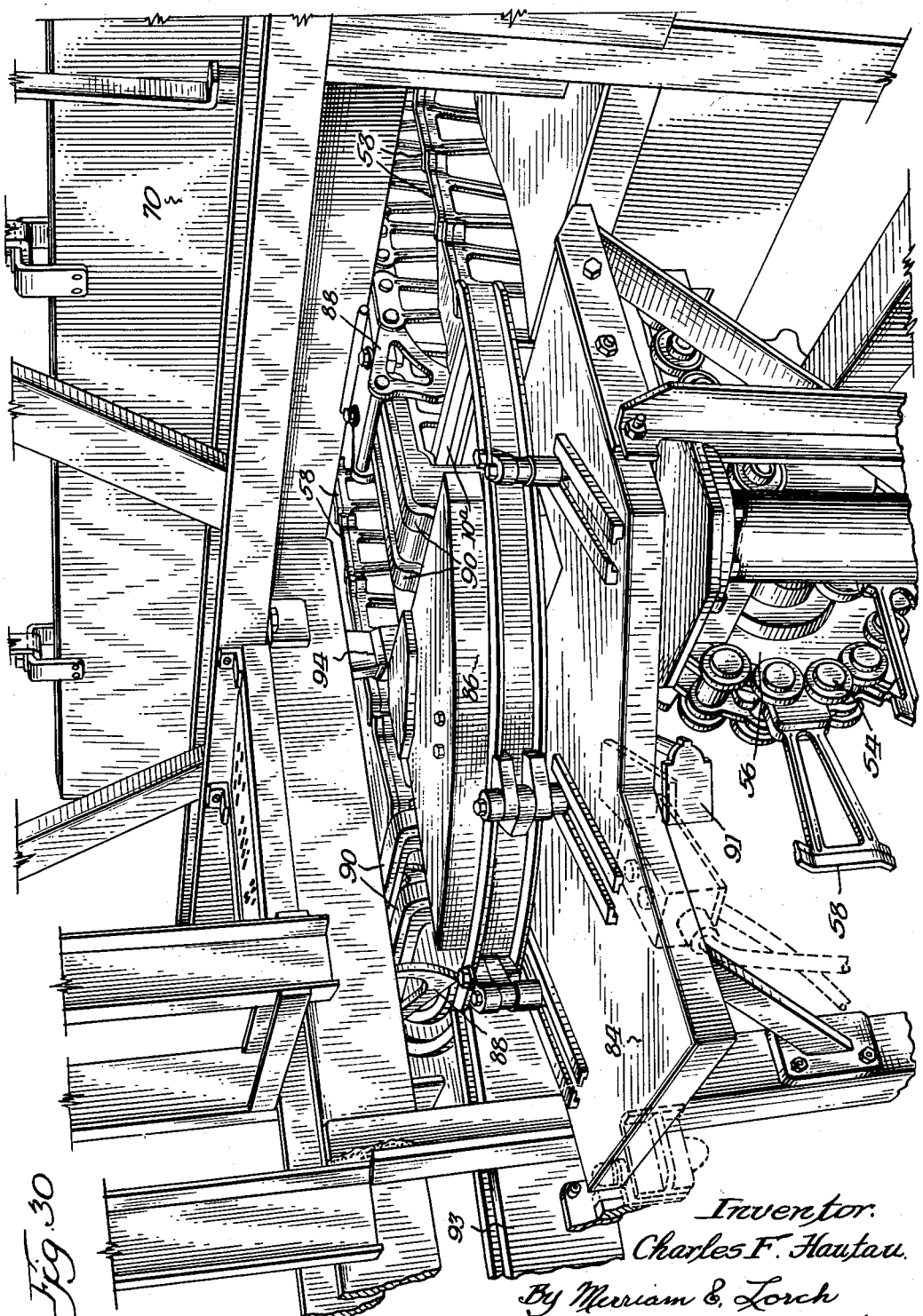

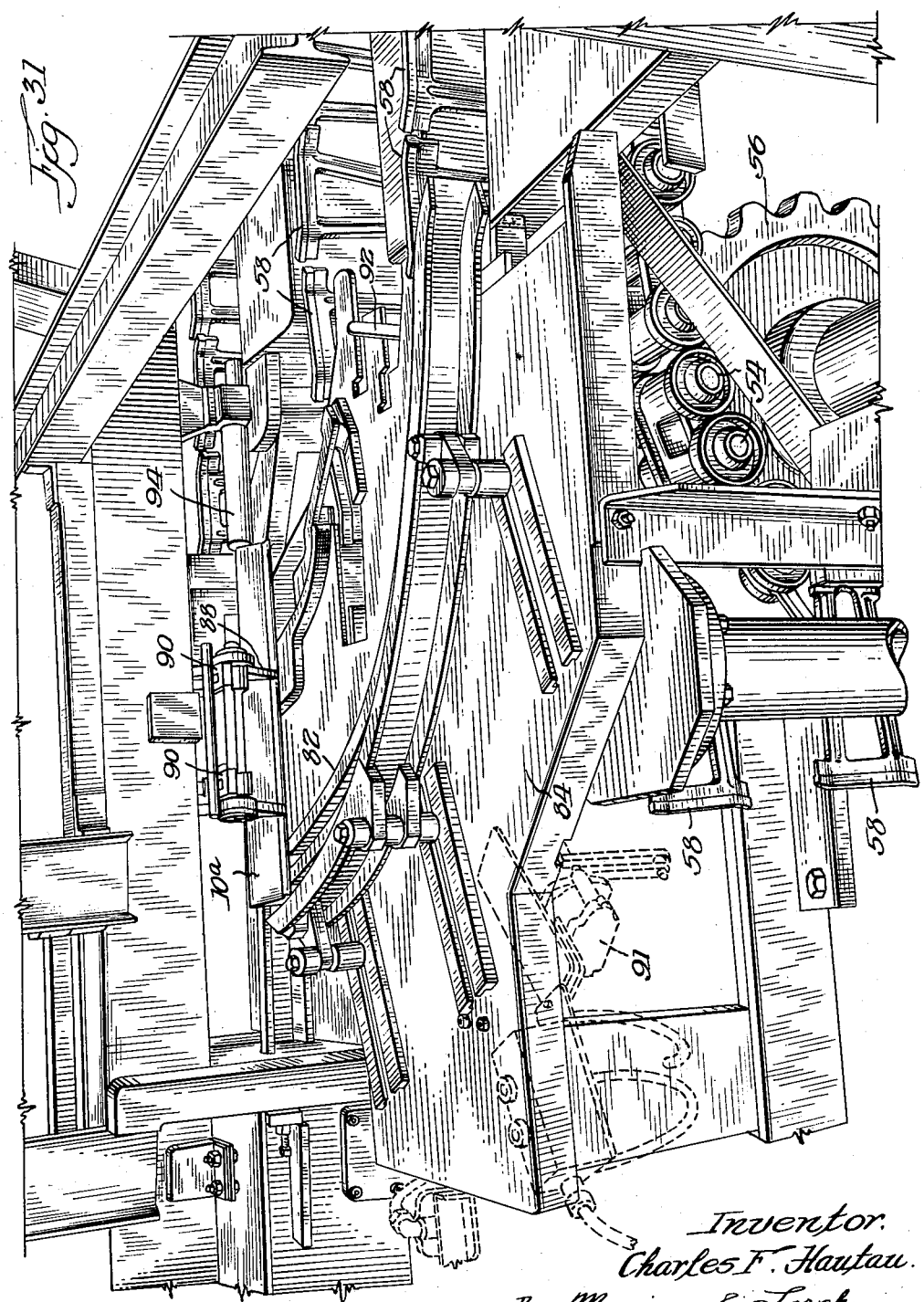

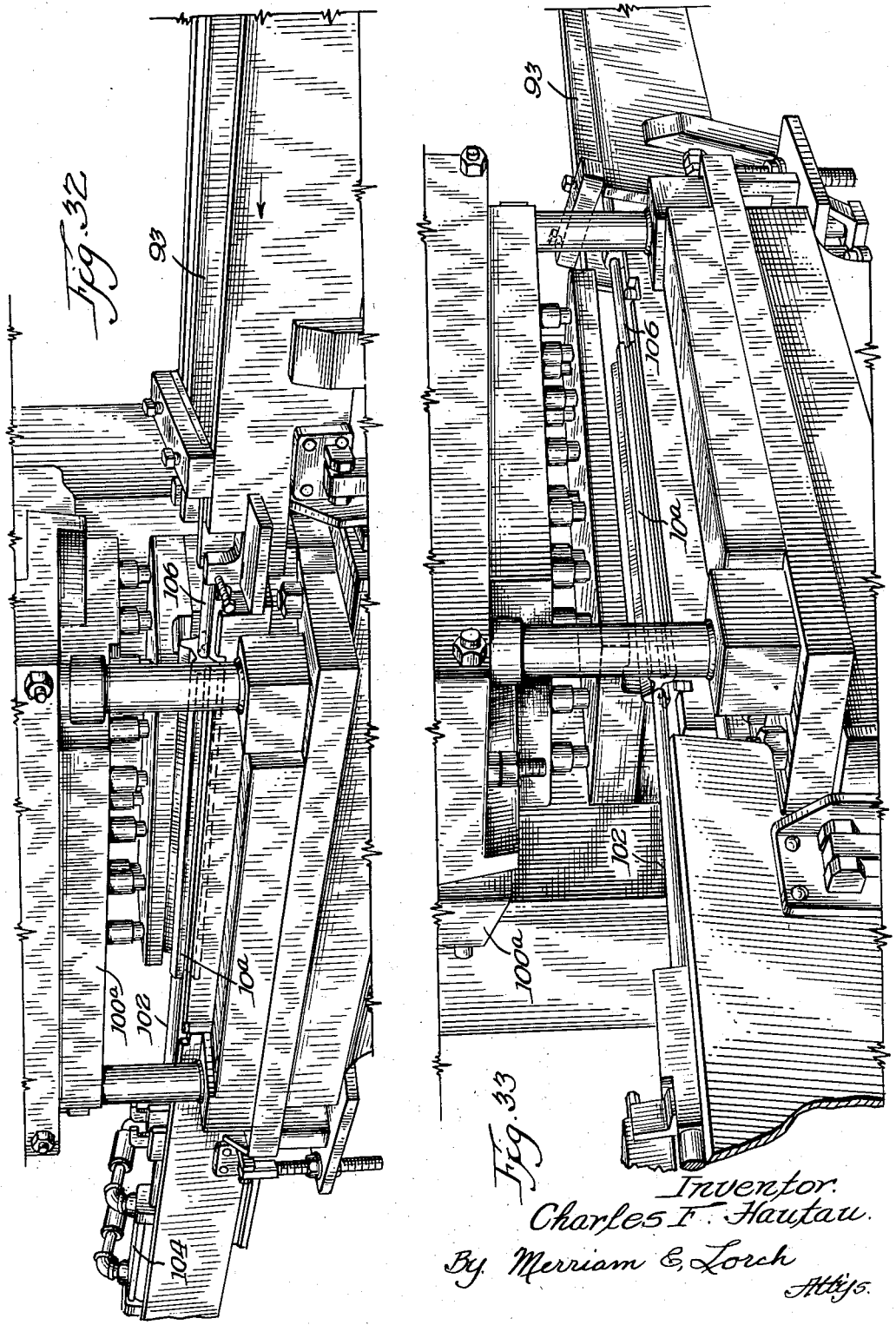

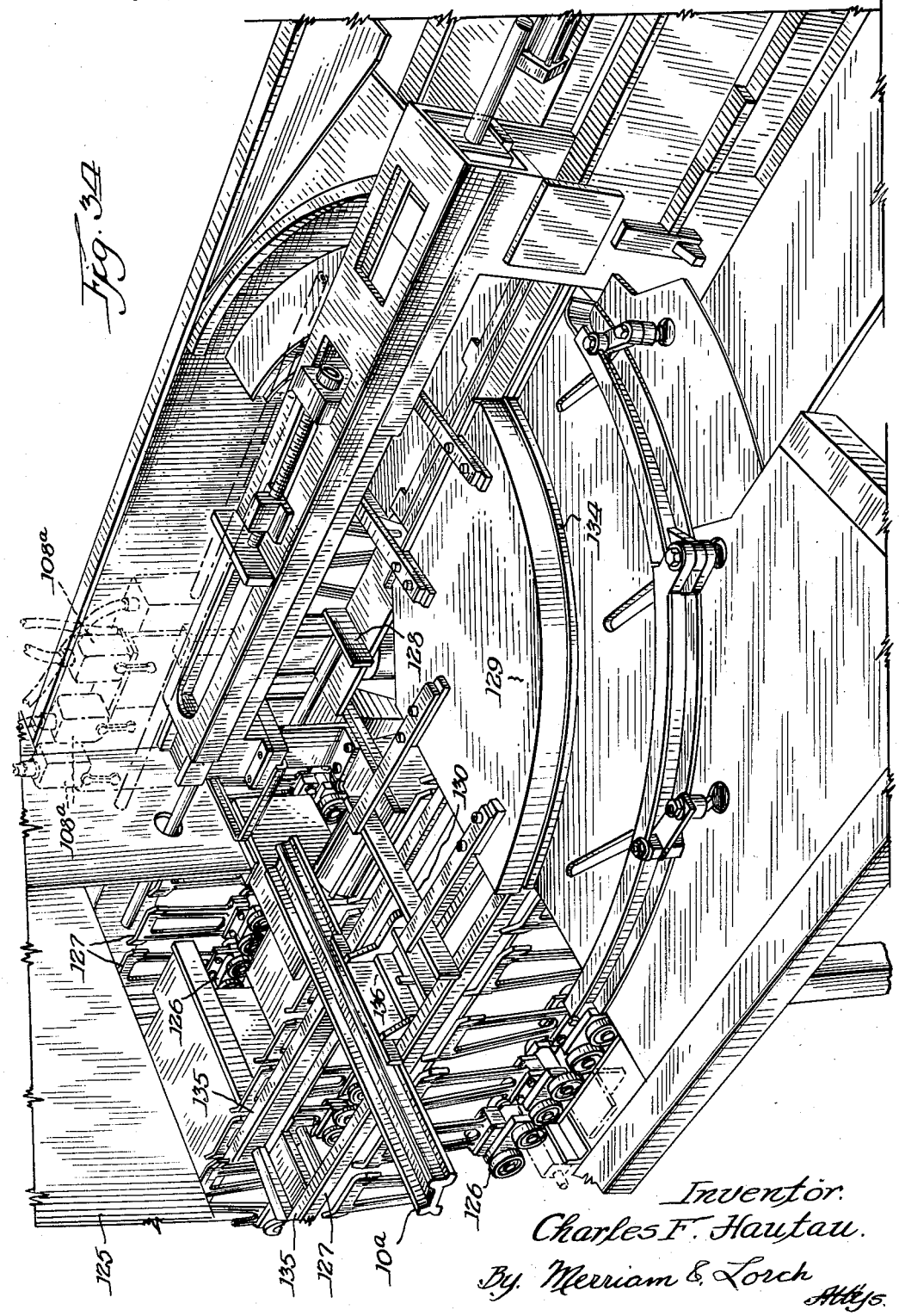

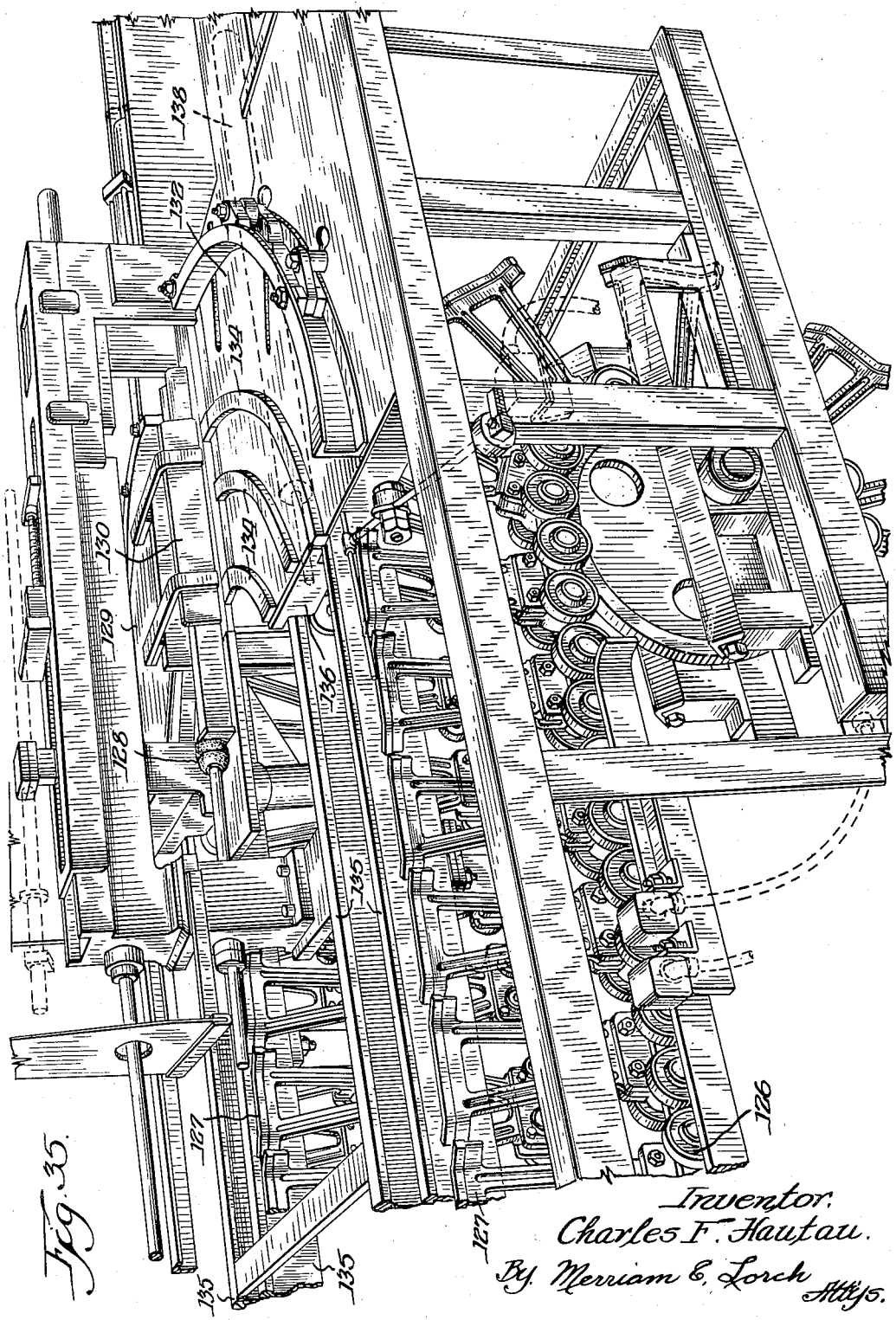

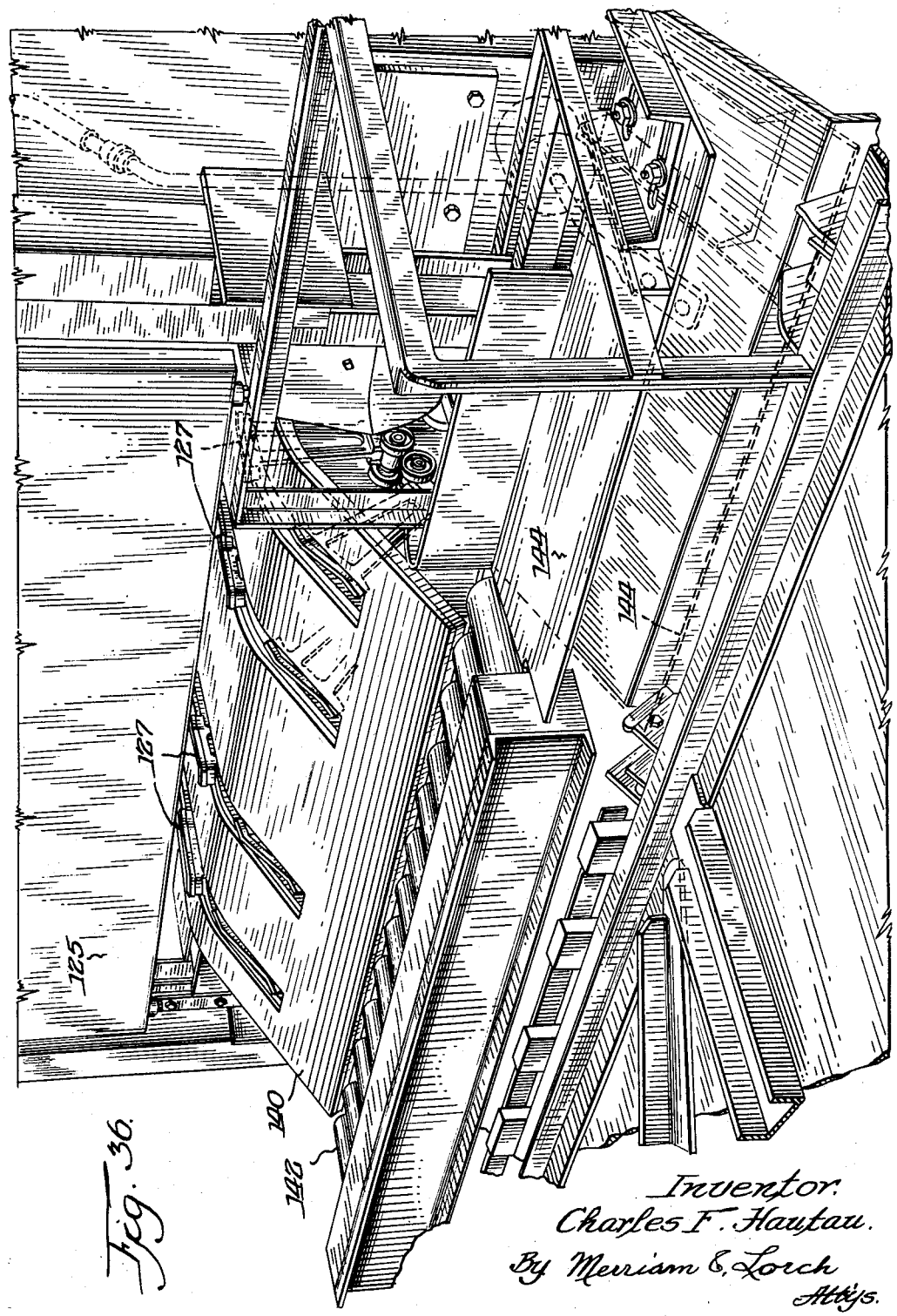

United States Patent Office 2,911,117
Patented Nov. 3, 1959

2,911,117

MANUFACTURE OF SPLICE BARS

Charles F. Hautau, Huntington Woods, Mich., assignor to Inland Steel Company, a corporation of Delaware Application May 3, 1957, Serial No. 656,913

2 Claims. (Cl. 214—18)

This invention relates to the manufacture of splice bars such as are used to connect the ends of railroad rails. Heretofore such bars were made by manually moving or carrying splice bar stock from one machine to another, such as the shear, heating furnaces, a series of presses, reheating furnace, and quench tank. Such a procedure required a great deal of floor space in the manufacturing area and many operators, i.e., much manual labor. All of this ran the cost of producing splice bars up to quite a high price.

According to this invention automation to a practical extent is achieved. The only manual operation is that of initially loading the splice bar stock upon storage skids at the start of the line and initially feeding the long bars into the beginning of the processing line. In general, the load of splice bar stock, i.e., hot rolled sections, as it is rolled and received from the mill in lengths from 15 to 40 feet and sometimes as long as 60 feet, is placed on the stock rack by cranes. Thereafter each bar is manually dragged onto a roller table from which the bar stock is fed automatically into the shear by a carriage which automatically starts the shear to cut the stock into splice bar lengths, while the carriage moves back to take a new hold for the next feeding move. After shearing, the cut bars are swept automatically into and through the heating furnace by two parallel chain conveyors which receive alternate bars from the shear. As the bars leave the furnace upon the two chains they are again swept automatically and alternately in a single line into a plurality of catapults which project the bars individually and progressively into and through three presses. As the bars leave the last press they are again automatically swept alternately upon a pair of parallel chain conveyors and carried through a reheating furnace. As the bars leave the reheating furnace they are discharged onto a conveyor which carries them into a quench tank. From the quench tank the bars are discharged onto an inspection conveyor, which in turn discharges the bars into a loading box.

A better understanding of this invention will be had from the following description when read in connection with the drawings in which:

Fig. 1 is a schematic plan view illustrating the layout and operation of the complete apparatus;

Fig. 2 is a schematic side elevation showing the bar of stock in position after its only manual movement and held by the rack clamp;

Fig. 3 is a similar view showing the bar of stock after having been moved by the shear carriage feeding device to the limit of its travel;

Fig. 4 is a similar view showing the bar of stock held in clamped position while the shear carriage has returned for another grip;

Fig. 5 is a similar view showing the carriage as having fed the bar of stock into the shear for the first shearing or cropping operation;

Fig. 6 is a similar view showing the bar of stock gripped by the rock and shear clamps and the shear performing its cropping operation while the carriage returns for another grip;

Fig. 7 is a similar view showing rack and shear clamps open and the bar of stock being pushed to its limiting stop by the carriage just prior to automatic shearing of a splice bar length;

Fig. 8 is a similar view showing the bar of stock, again clamped by the rack and shear clamps, and being sheared and the splice bar dropped upon a live conveyor while the shear carriage returns for additional stock;

Fig. 9 is a similar view showing the bar being carried to the furnace charging equipment;

Fig. 10 is a schematic plan view of the same;

Fig. 11 is a similar plan view showing how the bars are swept by the furnace charging mechanism into two paths preparatory to entering the furnace;

Figs. 12 and 13 are schematic plan views showing how the bars are discharged from the two furnace conveyors and formed into a single line and into the first press;

Figs. 14 and 15 are schematic side elevations illustrating the same;

Figs. 16 and 17 are schematic side elevations illustrating the operation of the first press;

Fig. 18 is a similar view illustrating the discharge of the bar from the first press toward the second press;

Fig. 19 is a similar view illustrating the discharge from the third press toward the reheating furnace. The same operating cycle is repeated at all three presses.

Fig. 20 is a schematic plan view of the same;

Fig. 21 is a fragmentary schematic side elevation showing the delivery of the bars from the reheating furnace conveyor to the live table for delivery to the oil quench;

Fig. 22 is a similar view showing delivery from the live table to the oil quench;

Fig. 23 is a perspective view of the stock pile and feeding table showing the first or rack clamp and end of the shear feeding carriage;

Fig. 24 is a perspective view of the first or rack clamp and feeding carriage as viewed from the rear of the line;

Fig. 25 is a perspective view of the feeding carriage and its mounting as viewed from the front or operator's side of the line;

Fig. 27 is a perspective view of the shear clamp holddown and illustrates the cropping operation as well as the power driven take off rolls and waste chute;

Fig. 28 is a perspective view from a shallow angle illustrating the furnace charging or feeding mechanism adjacent the front of the first, or heating furnace, as viewed from the operator's side of the line;

Figure 29 is a perspective view from a high angle further illustrating the mechanism as shown in Fig. 28 and bringing out in more detail the magazine feeding sections;

Fig. 30 is a perspective view from the discharge end of the first, or heating furnace, and showing the discharging or delivery mechanism, sweep arm, table, and furnace catapult;

Fig. 31 is a perspective view of the delivery end of the heating furnace and transfer mechanism taken from a shallower angle and showing the bar as being in line with the throwing mechanism of the furnace catapult;

Fig. 32 is a perspective view from the operator's side of the line showing the shock absorbing mechanism and catapult mechanism in connection with the second press, it being understood that these mechanisms are similar at each press;

Fig. 33 is a perspective view similar to that shown in Fig. 32 but taken from the opposite end and angle, also viewed from the operator's side of the line;

Fig. 34 is a perspective view from a high angle of the transfer and charging or feeding mechanism in connection with the second, or reheating furnace, as seen from the operator's side of the line;

Fig. 35 is a perspective view similar to Fig. 34 but from a lower angle and showing the sweep arm in a different position and the rapid feeding mechanism; and Fig. 36 is a perspective view from the operator's side of the line of the discharge end of the reheating furnace showing the conveyor rolls and tipping table for immersing the finished bars in the oil quench tank.

Figure 26:
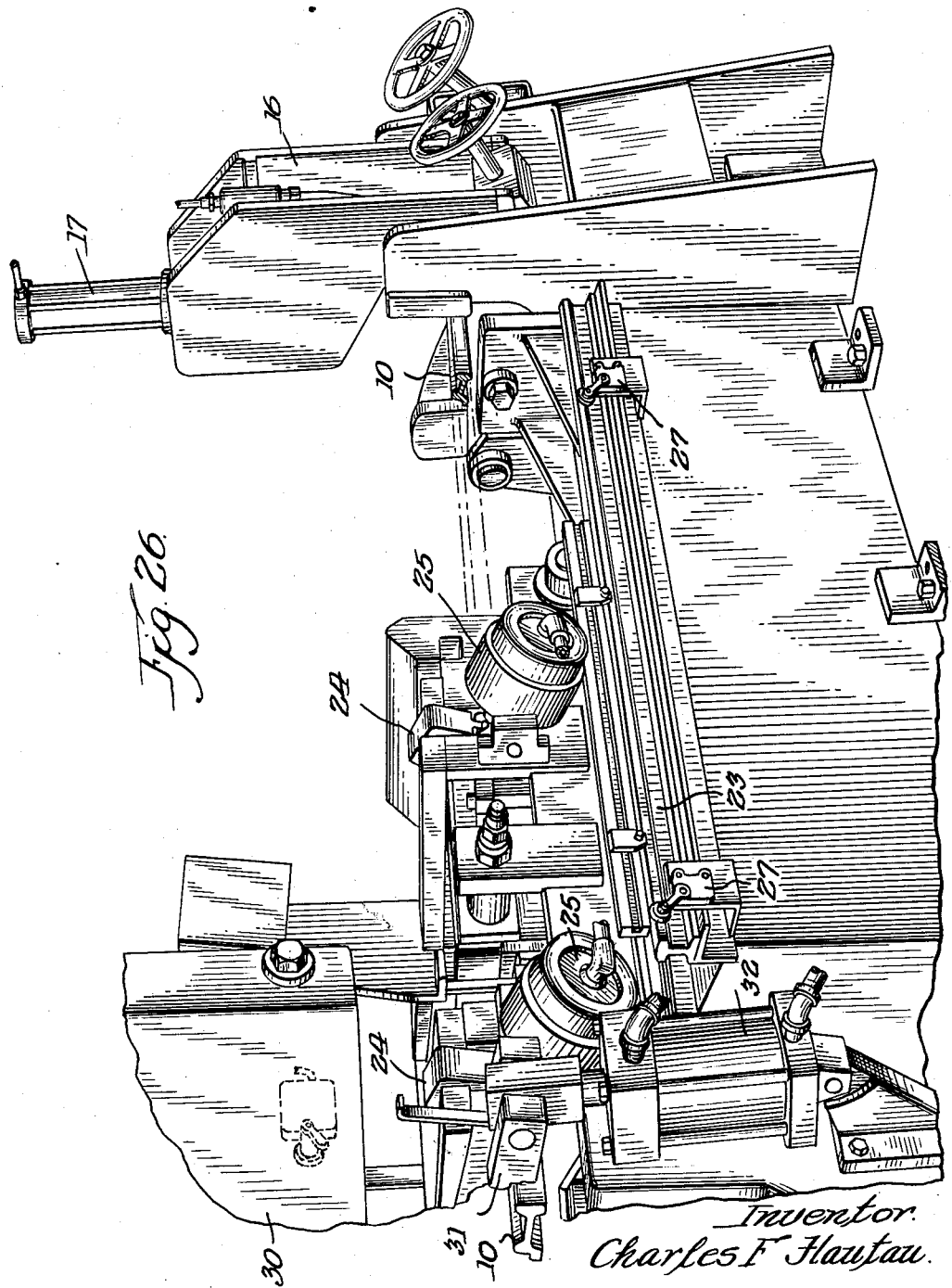
Fig. 26 is a perspective view from a different angle of the operating carriage and rack clamping mechanism as viewed from the operator's side of the line.

Referring now to the drawings, the operation and structure will be described simultaneously, starting with the bar stock. The splice bar stock 10 which is normally in sections 25 to 40 feet long, although sometimes as long as 60 feet, is placed on the stock rack 11, shown in Figs. 1 and 23, by an overhead mill crane (not shown). Each piece of bar stock 10 is manually pulled from the loading skids 12 onto a roller table 13, one roller 14 of which is shown in Fig. 23, and another of which is shown in Fig. 24, and also being shown schematically in Figs. 1 through 8. Each piece of bar stock 10 is manipulated so that the head end of the bar drop into then open jaws 15 of rack clamp 16, hydraulically operated by cylinders 17, shown in the same figures and located at the front end of the roller table and directly in line with the shear and the shear feeding mechanism later described. The front portion of the bar 10 projects through the clamp 16 which is then closed by the operator to hold the bar in position to be engaged by the shear feeding mechanism.

Shear feeder and shear

The shear feeding mechanism comprises a reciprocating carriage 20, illustrated in Figs. 24, 25, 26, and 27, and schematically in Figs. 1 through 8, and consists of an I-beam-like member 21 (Fig. 25) provided with flanged wheels 22 which travel on horizontal rails 23 upon a bed, securely fastened to the floor. I-beam 21 carries spaced pneumatic clamps 24, operated by pneumatic cylinders 25, for gripping the bar. The carriage 20 is caused to travel upon rails 23 by a hydraulic cylinder 26 (Fig. 25). Adjustable limit switches 27 determine the travel of the carriage and, accordingly, the length of the splice bar being sheared, inasmuch as the travel of the carriage determines the length of stock 10 fed to the shear 30, as determined by customers' specifications. The shear may be any suitable shear, such as a 900 ton capacity United Engineering Foundry Company shear with blades shaped to fit the bar sections. Obviously, the two clamps on the carriage could be manually operated. The feeder carriage is in the forward position, that is, a position nearest the shear, when the bar stock is pulled from the stock pile onto the roller table and is gripped by the rack clamp. The carriage is then moved rearwardly, that is, away from the shear, with the carriage clamps open to permit entry of the head of the bar, which is projecting through the rack clamp. As the carriage reaches its predetermined rear position, it actuates one limit switch 27 to stop movement of the carriage and to close the carriage clamps by well known connections, followed by opening of the rack clamps shortly thereafter.

The carriage also trips a pressure switch or shear clamp control (not shown) to thereafter start forward movement of the carriage toward the shear, pulling the bar stock with it. These movements are illustrated progressively in Figs. 2 and 3. As the carriage moves toward the shear and reaches a predetermined position, it engages the forward limit switch 27 which stops the movement of the carriage at which point the bar is in the shear, where it is gripped by the shear clamp 31, operated by a cylinder 32, and also by the rack clamp 15. At this point, the carriage clamps are opened and the carriage travels rearwardly again, under control of another pressure switch (not shown) on the carriage clamps, while the shear performs the first cutting or cropping of the end portion of the bar (Fig. 27); the cropped end dropping down a waste chute 33. Ordinarily, the bar will project sufficiently ahead of the carriage, as is shown in Figs. 2 and 3; however, if the bar has not been accurately placed, the clamps on the carriage are released and the carriage is returned rearwardly toward the rack clamp for additional movement of the bar.

The carriage 20 on its next forward movement, caused by engagement of the pressure stop, carries the bar 10 forward until its head end touches the customary adjustable gauge stop 35, indicated in Figs. 2 through 8; the position referred to being shown in Fig. 7. At this point the carriage clamps are again released, the shear and rack clamps closed, and the shear is tripped, as is customary under control of gauge 35. While the shear is cutting a splice bar 10a of the correct length to be processed, the carriage has engaged the forward limit switch 27 and the appropriate pressure switch and is returning to repeat the feeding and shearing operation continuously for the entire length of the loaded bar stock. Either or both, and preferably the latter, of the shear and rack clamps are used to hold the bar in position while the carriage is moved automatically with its clamps open and while the shearing takes place. Automatically the carriage clamps are closed when the carriage reaches its rear position and during the return forward movement of the carriage and stock while the shear and rack clamps are open.

Furnace feeder or charger

When a splice bar 10a of the correct length has been sheared it drops to a driven roller conveyor 40 of any well known construction, shown schematically in Figs. 10 and 11, and partially in Fig. 27, which conveyor moves the cut or sheared bars 10a from the shear 30 toward the heating furnace feeder.

As the carriage moves forward toward the shear to make the last cut on the bar of stock an auxiliary section 42 of idle feed rollers 43, shown more fully in Fig. 27, overlying and interspersed between the power driven feed rollers 40, is raised by any suitable manual, hydraulic, or pneumatic means under manual control (not shown) to support the leading or front of bar 10, which would otherwise drop, and thus support the bar to insure a square cut by the shear on the final length or spice bar 10a. After the last cut the auxiliary section of rollers is lowered and the sheared bar 10a is fed forward by the power driven rollers 40 until the leading end of the sheared splice strikes a spring loaded cushion stop 44, shown in Figs. 28 and 29. This position of the bar 10a at this point is shown schematically in Fig. 7. As the sheared bar 10a travels toward the cushion stop, the trailing end passes and clears a counter-balanced adjustable gate 45, shown in Fig. 9, which then drops behind the trailing end of the bar and serves as a rear end stop for the sheared bar, which is then located between the stop 44 and the gate 45, in position to be engaged by the furnace charging mechanism, as indicated diagrammatically in Fig. 9 and shown more fully in Figs. 28 and 29. The adjustable cushion stop 44 is positioned over the pivotal point of a quadrant-like sweep arm 50, positioned over a table 52 having wear strips 53, upon which the sheared bars 10a are fed by the power driven rollers 40, as diagrammatically shown in Figs. 9, 10, and 11, and more fully in Figs. 28 and 29.

Sweep arm 50 is positioned with its pivot at the longitudinal center line of the furnace and at the entry end (Figs. 28 and 29) of two pairs of parallel conveyor chains 54. These chains extend through the furnace and travel over sprockets 56 (Fig. 30) adjacent the entry of the furnace and driven by any suitable means, such as an electric motor and suitable gear reducer (not shown) on the sprocket shafts at the discharge end of the furnace.

and over idler take-up wheels 57 (Fig. 28) at the entry end of the furnace. Each chain carries vertical heat resistant bar supporting links 58. The power driven feed rollers 40 deliver the sheared bars 10a longitudinally, that is, lengthwise in a direction parallel to their longitudinal axes, to the table 52 i front of the sweep arm 50, which turns the bars broadside, i.e., through 90°, as will now be described.

When bar 10a strikes the spring cushion stop 44 the latter actuates limit switch 46 (Fig. 28) which causes the sweep arm to be actuated, i.e., swung through a 90° arc. The arm engages the sheared bar 10a, as shown diagrammatically in Figs. 9 and 10, and structurally in Fig. 28, and moves the sheared bar transversely, i.e., bodily, over the wear strip 53 on the table 52, positioning the bar broadside over the entering end of one pair of conveyor chains 54 and forward of one pair of a series of pairs of pivoted dogs 60 on carriage bars 62 (Fig. 29). After the sweep arm makes this movement to the position shown in Fig. 11, a second bar 10a is fed over table 52 by rollers 40 into position in front of the other face or edge of arm 50, and the sweep arm reverses its movement and bodily moves the second bar transversely to present it broadside, rather than longitudinally, to a position over the entering end of the second pair of parallel conveyor chains and in front of one pair of a second series of pairs of pivoted dogs 60, associated with the latter chains. These dogs swing about their pivots and pass under the bars and serve to prevent any rearward motion of the sheared bars. This operation of the sweep arm continues, that is, alternate bars are swept to alternate pairs of conveyor chains into what may be termed two magazine areas between the shear and the furnace, that is, one on each side of the furnace. These areas provide a bank of bars for continuous supply to the conveyor chains. This serves the dual purpose of maintaining continuous operation through the furnace in the event of any delay in the feeding or shearing operation and also permits accurate placement of the bars onto the carrier blades or supporting links 58 of the furnace chains or conveyors.

The sheared bars in each magazine are moved forward toward the furnace by the counter-balanced dogs 60 on bars 62 which bars are reciprocated by air cylinders 64. (Figs. 9, 10, 11, and 29.) The movement of cylinders 64 is under control of a limit switch 66 (Fig. 29), engaged by the splice bars 10a in timed sequence with the furnace chains, so that the bars 10a are deposited on the carrier blades at uniformly timed intervals.

Heating furnace

The furnace 70 may be a furnace such as a Flinn and Dreffein, having a hearth area of 8' x 55' with temperature and fuel air ratios automatically controlled, preferably at a temperature of the order of 1650° F. The furnace is a two strand furnace, that is, it has two pairs of parallel conveyors 54, each conveyor consisting of two chains, having the bar supporting conveying links 58 which permit the chain links to be out of the hottest portion of the heating chamber, i.e., below the hearth, as are the sprockets and driving mechanisms. The alloy carrier blades or links project through the hearth for support of the bars. As previously stated, any suitable means, such as an electric motor (not shown), may be used for driving the sprockets. Accordingly, the sheared bars pass through the heating oven broadside, so to speak, carried on the two parallel conveyor chains, being placed thereon by the sweep arm from the continuous longitudinal line of sheared bars, turned by the sweep arms and stacked in the magazine sections between the gate and forward stop.

Furnace unloading mechanism

The furnace unloading mechanism performs exactly the reverse function of the furnace charging mechanism. That is, as the sheared heated bars 10a come out of the discharge or hot end of the furnace in parallel streams, the bars must be returned to a single line of sheared bars, progressing in a longitudinal direction, rather than two lines broadside, for feeding into the plurality of presses for processing while hot. At the final end of their travel just outside of the furnace, the discharge ends of the conveyors 54 move the bars 10a on to wear strips 82, mounted on a table 84, where they are engaged by a second sweep arm 86, which is also a 90° arcuate segment, movable 90° about a pivot on the center line of the furnace. In this case, the sweep arm 86, instead of pushing the bars as in the case of the furnace charging quadrant, pulls the bars through a 90° arc, that is, rotates them from a broadside position to a longitudinal position. To accomplish this, each face or edge of the sweep arm is provided with a pivoted bifurcated gate 88 upon the ends of a pair of fingers 90. Gates 88 permit the bars, traveling on the furnace chains, to move under the gates which then pull the bars around alternately from the chains. The sweep arm is actuated by any suitable means, such as air cylinders 91 (Figs. 14 and 31), under control of limit switch 92 (Fig. 31), tripped by the bar in its final steps of forward movement off the furnace chains and under the gates. Sweep arm 50 is operated by a similar mechanism (not shown). Operation of arm 86 is shown diagrammatically in Figs. 12 and 13 which show how alternate bars are engaged from the two parallel conveyor chains and swung through an arc of 90° to place them in position for further movement in a guide trough 93 (Fig. 30) toward the presses. The structure involved is shown more particularly in Figs. 30 and 31.

At the pivotal point of the furnace discharge or unloading sweep arm there is an air operated catapult 94. As the sweep arm completes its movement and places the bar in position on the center line of the furnace, the arm actuates one of two limit switches 95 which causes operation of the catapult 94. The catapult thus operated strikes the end of the bar, firing it along trough 93 and into the first press 100 of three presses, as shown diagrammatically in Figs. 14 and 15, and structurally in Figs. 32 and 33 in connection with the second press 100a. This mechanism is similar as to all three presses.

Press loading and unloading

The three presses are of any well known make such as The Long and Allstatter Co. and in the illustrated embodiment of this invention are of 1150 tons capacity. They have a speed of about 8 strokes per minute, are synchronized and come to a stop at top dead center.

The sheared and heated bar 10a is moved along trough 93 by catapult 94 until bar 10a strikes the plunger 102 of a cushioning cylinder 104 (Fig. 15) at the discharge side of the press. At this time the plunger and cylinder are in their lowered position, i.e., in the trough in the path of the bar 10a with the plunger in its central or mid position. The plunger 102 is preferably made sectional so as to be adjustable to accommodate different length splice bars. In so moving, the bar passes over a lowered or retracted press catapult 106 which has been lowered below trough 93 by an air cylinder 107 (Figs. 14 and 18). Plunger 102 is moved into cylinder 104 by the bar and actuates the first of three limit switches 108. This causes the catapult 106 to rise on the entry side of the press (Fig. 16), followed by return movement of plunger 102 which moves the sheared heated bar backward, i.e., centers the bar between the catapult 106 and plunger 102 directly beneath the press 100a (Figs. 16, 32, and 33). Upon return movement of the cushion plunger 102 the second limit switch 108 is actuated, which starts the press which, in the case of the first press, straightens and slots the splice bar 10a, whereas in the second press, illustrated in Figs. 32 and 33, it punches the bar, and the third press cambers the bar. The press makes one cycle, as is customary. On its down stroke it actuates the bottom limit switch 109 which causes the plunger to return to its mid position. In so doing, the plunger actuates the third limit switch 108 which causes retraction of the cushion cylinder and plunger from the path (trough) of the bar. Upon its up or return stroke the press actuates the upper switch 109 (Fig. 18) which causes firing of the press catapult 106 (Fig. 18) on the entering side of the press to drive the bar 10a along trough 93 to the second press. It will be remembered that the cushioning cylinder has been raised out of the path of travel of the bar. When the catapult 106 is fired, it actuates a limit switch 110 which moves the cushioning device back into lowered position and upon retraction of the catapult it actuates another limit switch 111 which causes the catapult to be lowered out of the path of the next oncoming bar by cylinder 107.

Automatic interlocks are so arranged that the catapult will not fire unless the next press is clear to receive the bar being fired.

Catapult 106 drives the straightened and slotted bar 10a in the continued trough 93 toward the second or punch press 100a (Figs. 1 and 18), where it is stopped by a cushion cylinder and piston, identical to that associated with the first press. This latter cushioning device cooperates with a second press catapult 112 (Fig. 1) in exactly the same manner as described in connection with the first press. That is, the second press cushioning centers the bar 10a beneath the press and after operation of the press, which is the same as press 100, except that it is a punch press and forms holes in the bar. Following punching catapult 112 drives the bar 10a toward the third or camber press 100b where it is decelerated and stopped by a cushioning cylinder 116 and piston 118 (Figs. 1 and 19) and returned against the third press catapult 120. The cushioning cylinder 116, press 100b, and catapult 120 are constructed and function exactly the same as those associated with the other two presses with the result that after operation of the third press catapult 120 drives the processed bar 10a further down the trough 93 toward the second or reheating furnace.

*Second furnace loading*

The second furnace 125, which is a reheating or equalizing furnace, is substantially the same as the first furnace 70 and may be a Flinn and Dreffein furnace, having a capacity of 12,000 lbs. per hour of bars and having two double rows of chain conveyors 126, similar to chain conveyors 54, and having bar supporting links 127, similar to links 58 of the heating furnace 70. The chains are driven by a variable speed mechanism, such as a variable speed electric motor with suitable gear reducer, as is customary. The furance may have a hearth of 8 x 20 feet and be automatically controlled to maintain a temperature of approximately 1550° F. so as to raise the bars from a temperature of 1200° F. to approximately 1500° F.

The reheating furnace feeder mechanism operates substantially the same as the heating furnace feeder mechanism with the exception that there are no magazine areas employed.

When the bar 10a is catapulted from the #3 press (by catapult or ram 120) through a continuation of trough 93 and under a gate 131 (Fig. 19), similar to gate 88, it strikes a cushioning plunger 128 which in yielding engages the first of three limit switches 108a which causes return movement of the cushion to center the bar 10a between the cushion and gate 131. In so doing the cushion strikes the second switch 108a which returns the cushion to mid point whereupon it operates the third switch 108a and starts the sweep arm 129. Sweep arm 129 is similar to sweep arm 50, except that arm 129 has two guard rails 130 spaced from the forward or bar engaging ends of the sweep arm to prevent over-movement of the bars 10a by the sweep arm. The bars are delivered by alternate engagement of each forward edge of the sweep arm to a table 132 having arcuate wear rails 134 on its upper surface. The sweep arm thus moves the bars 10a received in tandem or longitudinally in a single file and moves them transversely to present them alternately broadside over wear rails 134 to guide rails 135, overlying the two ends of the chains 126 at the entrance to furnace 125. Rails 135 are slightly lower than the wear rails 134, thus the bars 10a drop approximately 1" to clear and pass under the guards 130. When in position on rails 135 the bars 10a lie in front of pusher plates 136 upon the ends of rams 138. The latter are under control of limit switches, which in turn are controlled by links 127 in such a manner that the rams 138 are actuated in timed sequence to deliver the bars directly over a pair of links 127 rather than between such links. The chains then carry the spaced bars 10a through the reheating oven 125. It will be understood that each succeeding bar is swept alternately first to one pair of chains and then to the other pair of chains of the reheating furnace. The purpose of the reheating furnace is to reheat and stress-relieve the bar after it has been processed through the three press operations.

As the bars are discharged from the exit end of the reheating furnace they are dropped from the chains upon a sloping apron 140 over which they slide by gravity to a driven roller conveyor 142, which carries the bars at right angles and again in tandem to a counter-balanced tilting discharge table 144 over which the bars slide by gravity into an oil quench tank 146, such as a tank 9 feet wide and 40 feet long and 8 feet deep, preferably filled with oil that is water cooled by tubes submerged in the tank. The bars fall upon a slat conveyor 148 which carries the bars through the quench tank to a discharge conveyor 150, which carries the bars out of the tank and deposits them upon an inclined apron 152 which, in turn, deposits the bars on a conveyor 154 having sweep arms projecting therethrough to move the bars through 90° to an inspection conveyor 156. This conveyor in turn conducts the inspected bars to a loading box 158, upon another conveyor 160, by means of which the loading box 158 may be rolled to any desirable point.

*Summary of operations*

From the foregoing it will be apparent that there has been provided a system and apparatus which, from a practical viewpoint, is automatic for producing splice bars from long sections of bar stock. The only manual operations are the initial movement of the bar stock from the rack 11 onto the table 13 and the final unloading of the completed and cooled splice bars. Each piece of bar stock 10 is manually pulled from the loading skids 12 onto a roller table 13 where the front portion of the bar projects through the rack clamp 15 which is then closed by the operator who may conveniently be stationed at a console C (Fig. 1) upon which all the necessary controls are mounted. The rack clamp 15 is closed and the reciprocating shear feeding carriage 20 is started on its movement away from the shear 30 and toward the bar of stock. At the end of its movement it strikes a limit switch 27, the carriage clamps 24 are closed and it drags the bar of stock toward the shear 30. As the carriage reaches the end of its forward motion, that is, toward the shear, it trips another limit switch 27 which stops its motion. If necessary, a cropping cut is made and the cropped end dropped in the chute 33, after which the carriage returns for another grip on the stock and is again fed toward the shear and upon the completion of this forward motion it again trips limit switch 27 and travels back for another grip and feeding movement. As the bar of stock 10 has been moved into the shear it strikes the usual adjustable gauge or stop 35 of the shear which causes operation of the shear. The sheared bar is then fed by the driven rollers of conveyor 40 toward the first or heating oven 70. That is, the sheared bar 10a is deposited on the center line of the furnace with its long axis parallel to it in front of one face or edge of the sweep arm 50. The sweep arm then swings the bars through 90° and places alternate bars on the two parallel conveyors 54 running through the furnace 70. At the delivery end of the furnace the bars are removed in a manner reverse to the feeder. They are again engaged by a sweep arm 86 which pulls the hot bars from the conveyor, alternately sweeps them through a 90° arc, so that the bars again lie on the center line of the furnace with their long axis parallel to the furnace. Each bar 10a is then struck on its trailing end by a pneumatic ram or catapult 94 that sends the bars through a trough 93 to the first straightener and a slotting press 100. In so doing, the bar engages a retractable cushion stop 102 at the discharge end of the press which returns the bar and centers it beneath the press. The engagement of the cushion stop 102 causes the press to operate after the bar 10a is correctly positioned. Upon the return stroke of the press it automatically causes the bar 10a to be struck on its trailing end by a ram or catapult 106 which delivers the bar through a continuation of the trough 93 to the second or punch press 100a. The bar 10a then proceeds through the punch press in a similar manner to that described and then to the camber press 115. After the camber press has functioned, a catapult 120, acting on the trailing end, feeds the processed bars 10a to another sweep arm 129 which turns the bars through a 90° angle and alternately positions them over a pair of parallel conveyors 126 associated with the reheating furnace 125. The bars 10a are accurately positioned on the carrier links or arms 127 of the conveyors by means of a pair of rams 138 under control of the carrier arms of the conveyors so that the bars 10a are accurately positioned over the carrier arms, rather than between them.

At the delivering end of the reheating or equalizing furnace the bars 10a slide down an apron 140 to a power driven roller table or conveyor 142, set at right angles to the furnace conveyors. The roller table 142 delivers the bars 10a to a tilting table 144 and then to a quench tank 146. A slat conveyor 148 carries them through the quench tank 146 and to a discharge conveyor 150 which removes the cooled bars to another conveyor 154, which delivers them to an inspection conveyor 156 which, in turn, delivers them to a loading position for loading into boxes 158.

The foregoing provides an automatic continuous in-line operation for processing splice bars from rolled bar stock right to the finished product. It is obvious that changes may be made in details of construction of the various units without departing from the spirit and scope of this invention as defined in the appended claims.

It is claimed:

1. Apparatus for feeding a furnace with a sequence of articles each spaced from the preceding and succeeding articles comprising a power driven roller infeed track whereupon the sequence of articles fed in single file is progressively moved, a sector-shaped sweep-arm having a pair of outwardly extending article-contacting edges normally constituting the radial boundaries of the sector-shaped sweep-arm, one of the boundary edges normally being positioned adjacent to the in-feed track at one side thereof, means for pivotally supporting the sector-shaped sweep-arm about an axis substantially centered upon the in-feed track for controllable rotary movement through an arc of substantially 90° about an axis normal to that of the in-feed track so that the sector-shaped arm alternately moves across the in-feed track from opposite directions between two extreme positions whereat in the first one the article-contacting edge is substantially parallel to and adjacent to one side of the in-feed track and the other radial article-contacting edge is positioned at substantially 90° to the direction of the in-feed track and in the second extreme position of motion the first-named article-contacting edge changes its position to one at approximately 90° to the direction of the article in-feed track and the second article-contacting edge is positioned adjacent to and parallel to the opposite side of the article in-feed track, a pair of article furnace-feed tracks extending parallel to each other and parallel to the in-feed track and spaced from each other so that the outer edges of the furnace-feed tracks are spaced from the center line of the in-feed track by approximately the radial length of the article-contacting edge of the sweep-arm, a continuous chain having spaced article-engaging feed means for feeding said articles along said furnace-feed track in spaced relation, a plurality of arcuately shaped wear strips extending beneath the area traversed by the sector-shaped sweep-arm in its rotation relative to the in-feed track and including substantially an arcuate path between the in-feed track and each furnace-feed track so that upon rotation of the sector-shaped sweep-arm in each direction successive articles upon the in-feed track are dislodged from the track and moved by the arcuate sweep-arm over the wear strips toward one or the other of the furnace-feed tracks, guide means for confining articles to the wear strips during sector-shaped sweep-arm movements, and sweep-arm control switch means positioned adjacent to the in-feed track adapted to be contacted by articles moved therealong to initiate on alternate contacts movement of the sector-shaped sweep-arm through a 90° rotation thereby to dislodge articles from the in-feed track along the wear strip toward one of the furnace-feed tracks and thereby turn the articles through an angle of 90° toward a first furnace-feed track relative to the position on the in-feed track, means responsive to the movement of the next succeeding article to reverse the direction of rotation of the sector-shaped sweep-arm through an angle of 90° to move the next succeeding article from the in-feed track toward the second furnace-feed track transverse to its location on the in-feed track, and fluid-operated pusher means to transfer the position-changed articles on the wear strips in a position to be engaged by the article-engaging and feeding means.

2. The apparatus claimed in claim 1 comprising, in addition, a second sector-shaped plate adapted to alternately remove articles from the dual furnace-feed tracks and to transfer articles alternately to a single out-feed track in aligned relationship corresponding to their position on the in-feed track.

No references cited.